United States Patent [19]

Marsh

[11] 3,898,321

[45] Aug. 5, 1975

[54] PREPARATION OF MACROPOROUS, HEAT-STABLE TITANIA HAVING HIGH PORE VOLUME

[75] Inventor: Christopher Herbert Marsh, Wilton, Conn.

[73] Assignee: American Cyanamid Company, Stamford, Conn.

[22] Filed: Feb. 28, 1973

[21] Appl. No.: 336,654

[52] U.S. Cl. ............... 423/615; 252/317; 252/461
[51] Int. Cl. ........................................... C01g 23/08
[58] Field of Search ............ 252/317, 461; 423/615

[56] References Cited
UNITED STATES PATENTS
2,553,402    5/1951    Connolly et al. ................... 423/615
R18,790    4/1933    Mecklenburg ...................... 423/615

FOREIGN PATENTS OR APPLICATIONS
456,544    11/1936    United Kingdom ................. 423/615

*Primary Examiner*—Richard D. Lovering
*Attorney, Agent, or Firm*—Harry H. Kline

[57] ABSTRACT

There is provided heat-stable, macroporous titania having high pore volumes and a process for preparing the same by feeding two separate streams of titanic sulfate and ammonium hydroxide solutions or their equivalents to a rapidly stirred "heel" of water while adjusting the proportions of titanic sulfate and ammonium hydroxide so as to maintain a constant pH in the water "heel" in the range from about 4.0 to about 8. There is then recovered by decantation, filtration or other suitable means a hydrous, macroporous titania precipitate which is next washed free of sulfate ions, then oven dried or spray dried to remove the excess water and, finally, calcined at temperatures up to 900°C.

6 Claims, No Drawings

PREPARATION OF MACROPOROUS, HEAT-STABLE TITANIA HAVING HIGH PORE VOLUME

The present invention relates to the preparation of heat-stable catalyst carriers, adsorbent gels and catalysts in a high state of purity. More particularly, the invention is concerned with the preparation of heat-stable, soft, white, macroporous titania precipitate in high purity utilizing a rapidly stirred "heel" of water into which diverse streams of titanic sulfate and ammonium hydroxide solutions or their equivalents are feed.

Titania gels of varying pore volumes are known. Methods for their preparation are similarly known. One method, for example, involves the neutralization of a titanyl sulfate aqueous solution by regulating the pH of the titanyl sulfate solution until a jelly is formed, washing the jelly, drying the latter, and then rewashing the dried gel with water to remove the water soluble products of reaction to obtain a hard, glassy gel of high purity. Unfortunately, this method as well as others in the art are not wholly satisfactory. This is because the plurality of washing steps increases the cost for the preparation of titania gels of high purity. Further, the products are both generally hard, glassy structures rather than soft, white precipitates and lack heat-stability above about 600°C. These characterizations decrease, for instance, their utility substantially in fluidized bed applications. If a process could be provided to overcome the disadvantages of the prior practice by eliminating a plurality of washing steps coupled with attendant high heatstability so as to obtain a soft, white, macroporous titania precipitate, such a process would fulfill a long felt need in the art.

It is, therefore, a principal object of the invention to provide a straightforward process for obtaining macroporous titania precipitate of both high purity and high heat-stability. It is a further object to provide an economical process for obtaining macroporous titania utilizing but a single water washing step to obtain macroporous titania which is characterized as being a soft and white precipitate having high heat-stability, heretofore unobtainable. Other objects and advantages will become apparent from a reading of the ensuing description.

To these ends, it has been unexpectedly found that a titania precipitate having a high pore volume at relatively high temperatures of at least 600°C. can be obtained in a straightforward, economical method. By providing for the introduction of separate solutions of titanic sulfate and ammonium hydroxide into a water heel or reservoir maintained at a predetermined pH range, there is eliminated the necessity of utilizing a plurality of intermittent wash steps due to incipient peptization of resultant titania gel drying the same and then rewashing the dried gel as shown in prior art procedures. Surprisingly, a single overall wash step of resultant titania precipitate without an intermittent drying step is all that is required to attain high purity and excellent thermal stability even at temperatures as high as 900°C., or higher. The titania obtained is found to have relatively high pore volumes in the range from about 0.8 to about 1.8 milliliters per gram and surface areas in the range of about 120 square meters to about 280 square meters per gram after drying at 250°C. After completion of a calcination operation at 600°C., pore volumes in the range from about 0.5 to about 1.1 milliliters per gram and surface areas in the range from about 50 to about 100 square meters per gram are obtained. Continuing the calcination at 900°C., pore volumes in the range from about 0.1 to about 0.5 milliter per gram and surface areas in the range about 5 to about 15 square meters per gram are obtained.

According to the process of the invention, there is obtained a macroporous titania of high purity and thermal stability having the majority of the pore volume in pores greater than 100 A radius by introducing two separate aqueous streams of titanic sulfate and ammonium hydroxide into a heel of water. The amount of heel present ranges from about 10 to 300%, based on the weight of titanic sulfate and ammonium hydroxide added. This heel or reservoir is maintained at a pH ranging from about 4.0 to about 8, and preferably between 4.5 and 6.5. The pH is so maintained by adjusting the proportions of the contacting streams. The heel is vigorously agitated while introducing the reactants so as to ensure intimate contact. There is then continuously formed a hydrous, soft, white precipitate during the period of addition of the reactants.

The hydrous titania precipitate is next washed and freed from sulfate ions as indicated by the absence of a precipitate with barium chloride solution. It is either filtered or decanted and the titania precipitate can be stored for prolonged periods of time, such as 60 days or longer, without any deleterious effect on the properties.

The washed titania precipitate is next either oven-dried or spray dried, usually at temperatures ranging from about 110°C. to about 250°C. The so-dried hydrous precipitate is next calcined at temperatures ranging from about 300°C. to about 900°C. to obtain high pore volumes of more than 0.40 ml/g with attendant high thermal stability. However, to obtain the highest pore volumes when conducting the calcination at about 900°C., it is of critical import to utilize initially in the process of the invention a relatively small heel in which is present some 10 to 100% water, based on the weight of the titanic sulfate treated and wherein the pH is maintained at between 4.5 and 6.5. There is thus obtained a porous, white, soft titania precipitate which is useful as a catalyst carrier or support in fluid bed catalysis operated at temperatures of at least 600°C, or higher.

Advantageously, titanic sulfate as employed herein can be prepared by dissolving pure anatase precipitate obtained from the ilmenite process in strong sulfuric acid.

In the present description, pore volume (P.V.) is measured in milliliters per gram by adding an amount of water to a known weight of titania. Water addition is terminated when the exterior surfaces of the titania particles just start to wet. Similarly compacted bulk density (C.B.D.) is measured in grams per milliliter by grinding titania powder so that it can pass through a 50 + mesh screen and then adding the so-screened powder to a calibrated graduated cylinder on a vibrating table. After vibrating for about 30 seconds, the volume and weight of the powder are measured and the compacted bulk density is determined. Further, the surface area of the resultant precipitate is in square meters per gram measured in the present specification by conventional methods utilizing nitrogen. One such method has been developed by Brunauer, Emmett and Teller.

In general, the amounts of titanic sulfate and ammonium hydroxide can be widely varied. What is of critical import is that the respective reaction solutions be present in amounts sufficient to provide a predetermined pH in the water reservoir which is receiving the two streams. A pH meter, for instance, can be used to determine the quantity of respective solutions which are introduced by maintaining the pH range between 4.0 and 8.0, and preferably between 4.5 and 6.5.

Although ammonium hydroxide are utilized in the examples below, their known equivalents can also be used. Illustrative are ammonia gas, ammonium carbonate, and ammonium bicarbonate.

The process of the present invention is further illustrated by the following examples which are not to be taken as limitative thereof. All parts and percentages are by weight unless otherwise indicated.

EXAMPLE 1

One-thousand (1000) milliliters of water are charged into a suitable vessel and stirred rapidly. There are next added 950 milliliters of titanic sulfate solution (which contains 100 g. soluble $TiO_2$ and 350 g. $H_2SO_4$ per liter) at a rate of about 30 milliliters per minute. Ammonium hydroxide (28% $NH_3$) solution is separately added at a rate of about 15 milliliters per minute which is sufficient to maintain the pH in the vessel at 4.5 to 5.0, resulting in the continuous precipitation of hydrous titania. An exotherm to 47°C. is observed during the reaction. After all the titanic sulfate solution is consumed, the pH is adjusteed to 6.5 by the addition of ammonium hydroxide and the resultant precipitate is allowed to stand for one half hour. The precipitate is then filtered and washed with water until the washings are free of sulfate ions utilizing the well known barium chloride test. The wet cake is then dried at 110°C. for 3 hours and then at 250°C. overnight, yielding 80 grams of a white cake which possesses a pore volume of 1.8 ml/g and a surface area of 285 square m/g. The cake is next ground, passed through a 50 mesh screen, and then is calcined at 600°C. for 1 hour. On analysis, the calcined material has a pore volume of 1.05 ml/g and a surface area of 55 sq. m/g. After calcination at 750°C. for 1 hour, a pore volume of 0.93 ml./g. and a surface area of 35 sq. m/g are obtained.

EXAMPLE 2

To a suitable reaction vessel are added 250 milliliters of water and rapidly stirred 1000 milliliters of titanic sulfate solution (containing 100 g. soluble $TiO_2$ and 350 g. $H_2SO_4$) are then added at a rate of about 20 milliliters per minute. Ammonium hydroxide solution (28% $NH_3$) is added separately at a rate sufficient to maintain the pH in the vessel at 6.5, resulting in the continuous precipitation of hydrous titania. An exotherm to 53°C. is observed during the reaction. The precipitate is allowed to stand overnight and is then filtered, washed free of sulfate ions, and oven-dried at 110°C. overnight to recover a dried white cake. The latter is ground, passed through a 50 mesh screen and oven-dried at 250°C. for five hours yielding 95 grams of titania.

Resultant dried powder is calcined for one hour at 600°C. possesses, an analysis, a pore volume of 1.05 ml./g. and a compacted bulk density of 0.50 g/ml. After calcination at 800°C. for 4.5 hours, the titania has a C.B.D. of 0.81 g/ml. and a pore volume of 0.60 ml./g. Finally, after calcination at 900°C. for 1 hour, it has a C.B.D. of 1.05 g./ml. and a pore volume of 0.45 ml./g. as well as a surface area of 5.9 sq. m/g.

EXAMPLE 3

The procedure of Example 2 is repeated in every respect except that 3000 milliliters of water are charged into the reactor prior to the addition of the titanic sulfate and ammonium hydroxide solutions. The temperature of the reaction mixture is maintained at 20°C. by use of an external cooling jacket. After calcination at 600°C. for 1 hour, the C.B.D. of the titania powder is 0.6 g/ml. and pore volume if 0.8 ml./g. Finally, after calcination at 800°C. for 3 hours, it has a C.B.D. of 1.12 g./ml. and a pore volume of 0.35 ml./g.

EXAMPLE 4

One-thousand (1000) milliliters of water are charged into a suitable vessel equipped with a stirrer and standing in an ice/water bath. To the rapidly stirred chilled water are added 1000 milliliters of titanic sulfate solution, containing 100 g. of soluble $TiO_2$ and 350 g. of $H_2SO_4$, at a rate of about 20 ml. per minute. Ammonium hydroxide solution (28% $NH_3$) is separately added at a rate of about 10 milliliters per minute. This is sufficient to maintain the pH in the vessel at 6.5, resulting in the continuous precipitation of hydrous titania precipitate. An exotherm to 20°–25°C. is observed.

After all the titanic sulfate is consumed, the ammonium hydroxide addition is discontinued and the resultant precipitate is next allowed to stand overnight without stirring. The precipitate is then filtered, washed free of sulfate and dried at 110°C. overnight. The precipitate is then dried at 250°C., yielding 95 grams of powder which is then ground to pass through a 50 mesh screen and calcined at 800°C. for 4 hours. The calcined powder has a C.B.D. of 0.78 g./ml., and a water pore volume of 0.55 ml./g.

EXAMPLE 5

Repeating Example 4 in every detail except that the cooling bath is removed and the rate of addition of the titanic sulfate solution is maintained at about 70 milliliters per minute. Simultaneously, the rate of addition of ammonium hydroxide is held at approximately 35 milliliters per minute to maintain the pH at 6.5. An exotherm to 50°C. is observed during the reaction.

After calcination of the dried gel at 800°C. for 5 hours, the titania has a pore volume of 0.45 ml./g., a C.B.D. of 0.78 g./ml. and a surface area of 21 sq. m./g.

EXAMPLE 6

The procedure of Example 4 is carried out in every detail except that the cooling bath is removed and an addition rate of titanic sulfate of about 6 milliliters per minute and a rate of addition of ammonium hydroxide of about 3 milliliters per minute are employed to maintain the pH at 6.5. An exotherm to 33°C. is observed during the reaction.

After washing resultant mixture free of sulfate ions, drying and calcining at 800°C. for 5 hours, the titania has a water pore volume of 0.8 ml./g., a surface area of 23.6 sq. m./g, and a C.B.D. of 0.6 g./ml.

EXAMPLE 7

88 Pounds of deionized water are charged into a 70 gallon tank in which the water is rapidly stirred. Titanic sulfate solution is next added at an initial rate of 3.6 pounds/minute and ammonium hydroxide solution is then separately added at a rate sufficient to maintain the pH in the tank at 6.5, resulting in the continuous precipitation of titania. During the reaction an exotherm is observed at 35°C. which temperature is maintained throughout the reactant additions. After the additions of 420 pounds of titanic sulfate and 164 pounds of ammonium hydroxide have been added, the stirring was discontinued. The resultant titania slurry is next run into four, 55 gallon drums until each is about one-third full.

A one pound sample of the titania slurry is immediately removed, filtered and washed with water until the washings are free of sulfate ion, as indicated by a barium chloride solution test and dried at 110°C and then at 250°C. The dried precipitate is then ground to pass through a 50 mesh screen giving a powder having a compacted bulk density (C.B.D.) of 0.38 g./ml. A sample of the powder, when calcined at 600°C. for 1 hour, has C.B.D. of 0.52 g./ml. and a pore volume of 0.95 ml./g.

Each of the four - 55 gallon drums containing titania is filled with water and after titania particles had settled, the supernatant liquor is decanted. More water is added to the decanted precipitate which is then stirred and allowed to settle again. Washing by decantation is continued several times over a 10 day period until the last decant shows a negligible amount of sulfate ion as indicated by a barium chloride solution test. The precipitate in each drum is then allowed to stand for two months before being spray dried to yield 29 pounds of dried titania. Samples of the spray dried powder are dried at 250°C. for 3 days yielding a C.B.D. of 0.47 g./ml., a pore volume of 1.05 ml./g., and a surface area of 123 sq. m./g. After calcination at various temperatures, the following properties were obtained as summarized in Table I below.

Table I

| Temp. | Time | Pore Volume (in ml/g) | C.B.D. (in g/ml) | Surface Area (in sq. m/g) |
|---|---|---|---|---|
| 600°C | 1 hour | 0.96 | 0.50 | 62 |
| 600°C | 4 days | 0.84 | 0.57 | 40 |
| 750°C | 2 hours | 0.70 | 0.61 | 32 |
| 800°C | 2 hours | 0.65 | 0.67 | 30 |
| 900°C | 1 hour | 0.38 | 1.05 | 12 |

This example illustrates the good thermal stability of titania precipitates over a range of temperatures from 600°C. to 900°C.

EXAMPLE 8

The procedure of Example 7 is repeated in every detail except that the pH of the mixture during the reactant additions is maintained at 8 rather than 6.5 After spray drying and calcining at 600°C. for 2 hours, the titania precipitate has a C.B.D. of 0.68 g./ml. and possesses a pore volume equal to 0.65 ml./g. After calcination at 900°C. for 2 hours, it has a C.B.D. of 2.0 g./ml.

EXAMPLE 9

To illustrate the effect of omitting a heel of water as an aid during reaction, the following example is presented.

Titanic sulfate solution (100 ml) and 70 ml. of ammonium hydroxide solution (28% $NH_3$) are rapidly mixed with stirring to yield a white precipitate with considerable spitting and loss of ammonia. An exotherm to about 85°C. is observed and the final pH is 6.5. The precipitate is filtered, washed free of sulfate and dried at 110°C. After calcination at 600°C. for 1 hour, the powder has a low pore volume of 0.44 ml./g. and a surface area of 63 sq. m./g.

I claim:

1. A process for preparing heat-stable, macroporous titania which consists in the steps of: feeding two separate streams of aqueous titanic sulfate and ammonium hydroxide, respectively, into a vigorously stirred aqueous heel consisting of water, adjusting the proportions of the streams so as to maintain a pH ranging from about 4.0 to 8, effecting continuous precipitation of a hydrous, titania precipitate, water washing the resultant precipitate until free from sulfate ion, drying the so-washed precipitate, calcining the same at a temperature ranging from 300°C. to 900°C., and recovering a macroporous, heat-stable titania having both (a) high pore volumes ranging from 1.10 ml./g. to 0.40 ml./g. and (b) the majority of the pore volume in pores greater than 100 A radius when calcined at temperatures ranging between 600°C. and 900°C.

2. The process according to claim 1 wherein the pH of the aqueous heel is maintained between 4.5 and 6.5.

3. The process according to claim 1 wherein the calcining temperature is maintained at 600°C.

4. The process according to claim 2 wherein the calcining temperature is maintained at 900°C.

5. The process according to claim 1 wherein the drying of the so-washed precipitate is carried out by spray drying the same at a temperature of at least 110°C.

6. The process according to claim 1 wherein the drying of the so-washed precipitate is carried out by oven drying the same at a temperature of at least 110°C.

* * * * *